Oct. 20, 1936.  R. S. SANFORD  2,057,743
BRAKE
Filed Sept. 15, 1932  2 Sheets-Sheet 1
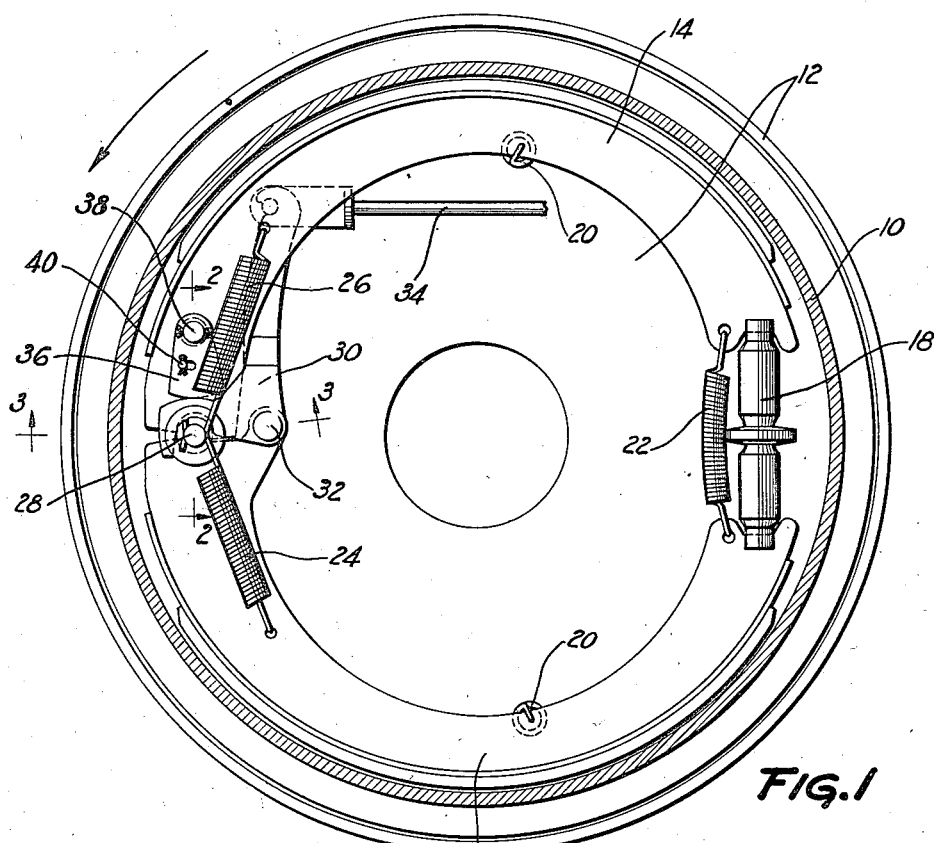
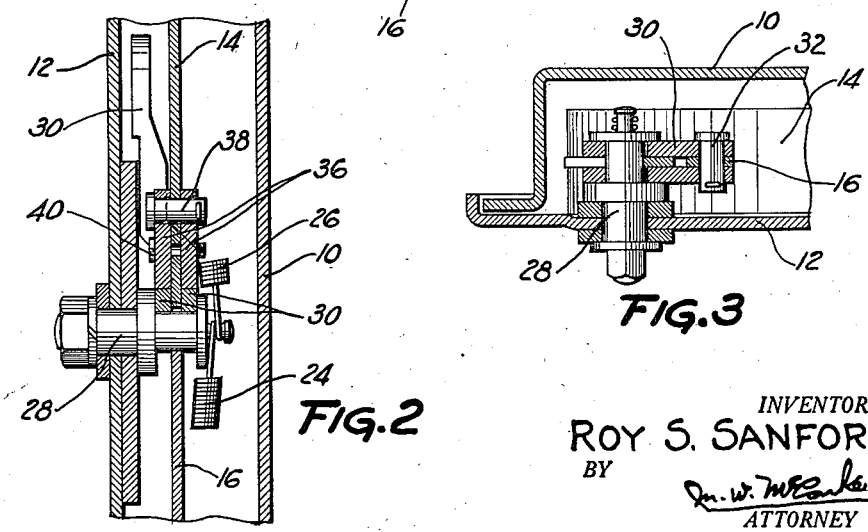
INVENTOR.
ROY S. SANFORD
BY
*Jn. W. McCauley*
ATTORNEY

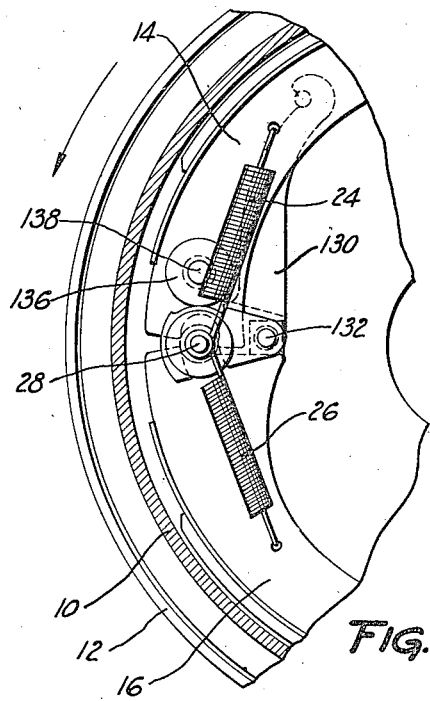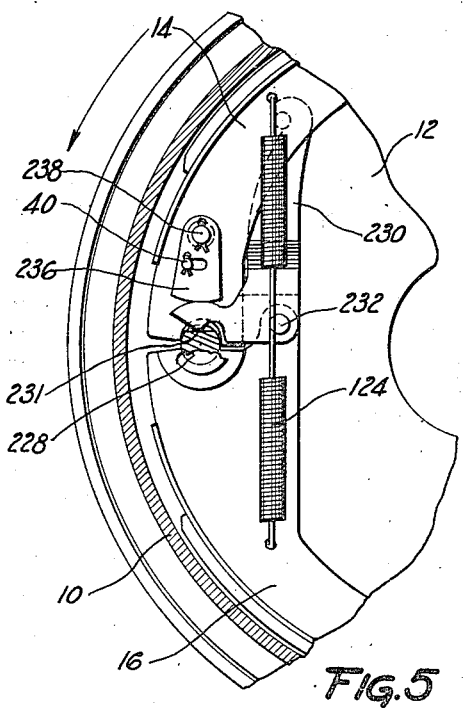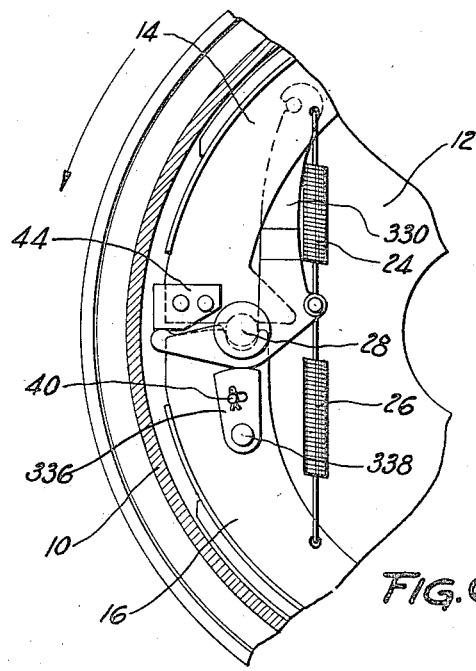

Patented Oct. 20, 1936

2,057,743

UNITED STATES PATENT OFFICE 2,057,743

BRAKE

Roy S. Sanford, South Bend, Ind., assignor to Bendix Aviation Corporation, South Bend, Ind., a corporation of Delaware Application September 15, 1932, Serial No. 633,345

11 Claims. (Cl. 188—78)

This invention relates to brakes, and is illustrated as embodied in an internal expanding automobile brake of the shiftable anchorage type.

An object of the invention is to provide a simple arrangement of the parts of the brake permitting a self-adjusting movement of the friction means with respect to the brake anchorage while the brake is applied, to compensate for irregularities in the surfaces of the drum and of the friction means, and distortions of the drum and of the friction means and the like. As an additional object, I prefer to arrange these parts in such a manner that the torque of the brake, at least when the drum is turning in a forward direction acts (for example, through the applying means) to vary the application of the brake automatically to compensate at least partially for variations in brake lining friction, in "servo action", and the like.

In the arrangements illustrated in the drawings, this desired action is secured by arranging the parts so that the friction means anchors, at least in a forward direction, through the applying device by having in engagement therewith a part which has a rolling movement, and which may be a roller or a segmental roller mounted on the end of the friction means. This permits the desired self-adjusting movement of the parts through rolling movement of the thrust device against the applying means, and at the same time provides for a resistance to movement of the applying means which is a function of the braking torque, so that it compensates at least in part for fluctuations in brake lining friction and in "servo action".

I prefer to use as an applying device on a brake of this sort, a bell crank lever which may be pivotally or otherwise movably mounted on one end of the friction means and which engages the brake anchorage, and through which the braking torque is transmitted to the anchorage by the above described segmental roller or other part having movable engagement with the applying lever.

The above and other objects and features of the invention, including various novel combinations of parts and desirable particular constructions, will be apparent from the following description of the several illustrative embodiments shown in the accompanying drawings, in which:

Figure 1 is a vertical section through one brake, just inside the head of the brake drum, showing the brake shoes in side elevation;

Figure 2 is a partial section on the line 2—2 of Figure 1 showing the arrangement of the applying means and the part in rolling engagement therewith, and their relation to the brake anchorage;

Figure 3 is a section on the line 3—3 of Figure 1 showing these same parts;

Figure 4 is a partial view corresponding to the left hand portion of Figure 1 and showing a modified form of applying means and associated parts; and Figures 5 and 6 are partial views, corresponding to Figure 4, and showing different modifications.

In the brake illustrated in Figure 1, there is a rotatable drum 10, intended to be carried by an automobile wheel, and which turns in this figure in a counterclockwise direction when the automobile is moving forward, and at the open side of which is arranged a suitable stationary support, such as a backing plate 12, intended in the case of an automobile brake to be mounted on the front knuckle or on the rear axle. The drum 10 and the backing plate 12 define between them a substantially closed brake chamber containing the brake mechanism proper.

The particular brake illustrated, and which is of the shiftable anchorage type, includes a pair of shoes 14 and 16 connected by a suitable adjustable articulating link or connection 18 and provided with suitable steady rests 20 and the like. The shoes 14 and 16 are shown held against the ends of the adjustable link 18 by a tensioned coil spring 22 and are provided with suitable return springs 24 and 26. The return springs 24 and 26 are shown as tensioned between the respective shoes and a stationary anchor pin or the like 28 carried by the backing plate 12. The spring 26 is shown as being heavier than the spring 24 to insure that, at least when the car is moving forward, the friction means will remain anchored instead of leaving the anchorage during the preliminary expanding of the shoes and then coming back to the anchorage with an undesirable shock or "click".

In order to achieve the objects of the present invention, while the lower shoe 16 (which is only anchored in reverse braking) may directly engage the anchorage 28, as shown, the upper shoe 14 (which is the one which is normally anchored, that is, anchored in forward braking) is arranged to transmit the braking torque to the anchorage 28 through the medium of an applying device, such as a bell crank lever 30 shown as pivoted at 32 on the shoe 16 and as having a hook-shaped portion seated over the anchorage 28. The bell crank lever 30 is shown as having its lower end bifurcated so that it has parts on both sides of the ends of the shoes. The bell crank has its upper end extending into the space between the web of shoe 14 and the backing plate 12, and has connected thereto suitable operating means, such as a cable 34 passing through the backing plate and forming part of a so-called "Bowden type" control.

According to an important feature of the present invention, the inter-engagement of shoe 14 with the bell crank lever 30 or its equivalent is through the medium of a part mounted on the shoe and having rolling engagement with the lever and shown as being a segmental roller 36, or a pair of such rollers on opposite sides of the shoe web on the ends of a pivot pin 38 passing through the web. This permits the shoe 14 to shift bodily radially of the drum, to adjust its position to that of the drum and automatically compensate for drum distortion and the like.

While such self-adjusting movement is not in any way interfered with, a substantial degree of equalization of braking torque as between the right and left brakes is secured by reason of the fact that the torque is transmitted to the anchorage post 28 through the applying device or bell crank lever 30, thereby causing a friction between the lever 30 and the post 28 which resists applying motion of the lever in a greater or less degree which is a function of the torque. Thus, for example, if the torque of the right brake is heavier than that of the left, because of variations in lining friction or for any other reason, there is a compensating increase of resistance to movement of the right applying lever. As explained in my Reissue Patent No. 17,147, this compensating action may be accentuated, even to the point of virtually complete torque equalization, by suitable cam surfaces formed on the lever 30 and engaging the segmental rollers 36.

Means, such as a pin 40, carried by the web of the shoe and projecting at its ends through slots in the segmental rollers 36, may be provided if desired to limit the rolling or pivotal movement of the segmental rollers.

In the arrangement of Figure 4, the bellcrank lever 130, pivoted at 132 on shoe 16, has a hook-shaped bifurcated end straddling the end of the web of shoe 14 and seated over the anchorage post 28, and engaged by a pair of rollers 136 on opposite ends of a pin 138 passing through the web of shoe 14.

In the embodiment of Figure 5, there is a single return spring 124 instead of the springs 24 and 26, and the bell crank lever applying device 230, pivoted at 232 on shoe 16 and engaged by segmental rollers 236 on shoe 14, is formed with a rounded projection or fulcrum 231 rocking on a flattened surface on the anchorage pin 228.

In Figure 6, the bell crank applying lever 330 is not directly pivoted to either shoe, but is a floating lever having a hook-shaped portion seated against the bottom of anchorage pin 28, and a rounded thrust portion at its outer end pushing upwardly against a small bracket 44 riveted to shoe 14, and a rounded portion opposite the anchorage pin 28 engaged by segmental rollers 336 pivoted at 338 on opposite sides of the web of shoe 16. It should be noted that return springs 24 and 26 are in this case connected to the lever 330.

While several illustrative embodiments have been described in detail, it is not my intention to limit the scope of the invention to those particular embodiments, or otherwise than by the terms of the appended claims.

What I claim as new and desire to secure by Letters Patent, is:

1. A shiftable brake having an anchorage, friction means, an applying device for the friction means, means transmitting the braking torque with a rolling action through the applying means to the anchorage in one position of said shiftable anchorage, the brake being so arranged that in the other position of the anchorage the torque is transmitted directly from the friction means independently of said applying means.

2. A brake comprising a drum, a fixed anchorage, friction means having one part anchoring thereon in one direction of drum rotation and a different part anchoring thereon in the opposite direction of drum rotation, a lever applying device for the friction means, and a part having rolling engagement with the applying device and transmitting the braking torque of the friction means through the applying device to said anchorage in one direction of drum rotation, the friction means directly engaging and transmitting its torque to said anchorage in the other direction of drum rotation.

3. A brake comprising a drum, an anchorage, an applying device, and friction means anchoring directly on said anchorage in one direction of drum rotation and having a part in rolling engagement with the applying means and transmitting the braking torque through said applying means to the anchorage in the other direction of drum rotation.

4. A brake comprising a friction means having adjacent separable ends, an anchorage adjacent said ends and so arranged that braking torque can be transmitted directly thereto by one of said ends, an applying device acting on said ends and engaging the anchorage, and a part movably mounted on the other end of said friction means and movably engaging the applying device and arranged to transmit the braking torque from said other end through the applying device to the anchorage by a rolling movement.

5. A brake comprising friction means having adjacent separable ends, an anchorage adjacent said ends and directly engaged by one of said ends, an applying device adjacent the anchorage and acting on said ends and engaging the anchorage, and a roller device mounted on the other end of said friction means and movably engaging the applying device.

6. A brake comprising friction means having adjacent separable ends, an anchorage adjacent said ends and directly engaged by one of said ends, an applying device mounted on said one end and engaging the anchorage, and a movable thrust part mounted on the other end of the friction means and in rolling thrust engagement with said applying device.

7. A brake comprising friction means having separable ends, an anchorage adjacent said ends and engaged by one of said ends, a bellcrank lever pivoted on said one end and engaging the anchorage, and a roller thrust device on the other end of the friction means engaging the bell crank lever.

8. A brake comprising, in combination, friction means having separable ends, applying means associated therewith, an anchorage between and directly engaged by one of said ends, and means carried by the other of said ends for transmitting the entire braking torque to said anchorage through the applying means from said other end by a rolling action.

9. A brake comprising, in combination, friction means having separable ends, an anchorage adjacent said ends, and means for transmitting braking torque to said anchorage including a segmental roller mounted on at least one of said ends and transmitting the torque to the anchorage by a rolling action.

10. A brake having shiftable anchorage friction means, an applying device for the friction means, and means transmitting the braking torque with a rolling action through the applying means to an anchorage, said anchorage being located between the shoe ends and in line therewith to receive the braking torque in a direct manner.

11. A brake having friction means with adjacent separable ends, an anchorage between said ends and directly engaged by one of said ends, an applying device comprising a lever acting on said ends, and a part pivotally mounted on the other of said ends and having rolling engagement with the applying device and transmitting the braking torque through the applying device to the anchorage.

ROY S. SANFORD.